United States Patent
Studart et al.

(10) Patent No.: US 8,889,761 B2
(45) Date of Patent: Nov. 18, 2014

(54) METHOD FOR THE PRODUCTION OF REINFORCED MATERIALS AND REINFORCED MATERIALS OBTAINED USING THIS METHOD

(75) Inventors: André Studart, Zürich (CH); Randall M. Erb, Zürich (CH); Rafael Libanori, Zürich (CH)

(73) Assignee: ETH Zurich, Zurich (CH)

( * ) Notice: Subject to any disclaimer, the term of this patent is extended or adjusted under 35 U.S.C. 154(b) by 16 days.

(21) Appl. No.: 13/638,496

(22) PCT Filed: Mar. 21, 2011

(86) PCT No.: PCT/EP2011/001381
§ 371 (c)(1),
(2), (4) Date: Nov. 8, 2012

(87) PCT Pub. No.: WO2011/120643
PCT Pub. Date: Oct. 6, 2011

(65) Prior Publication Data
US 2013/0053471 A1    Feb. 28, 2013

(30) Foreign Application Priority Data

Mar. 29, 2010   (EP) ..................................... 10003358

(51) Int. Cl.
| | |
|---|---|
| B29C 70/62 | (2006.01) |
| C08L 63/00 | (2006.01) |
| C08K 3/22 | (2006.01) |
| A61K 6/087 | (2006.01) |
| C08L 75/04 | (2006.01) |
| B82Y 30/00 | (2011.01) |
| B29C 70/02 | (2006.01) |
| B29C 67/24 | (2006.01) |
| C08J 5/06 | (2006.01) |
| C08J 5/24 | (2006.01) |
| B29K 105/16 | (2006.01) |

(52) U.S. Cl.
CPC ............... *B29C 70/025* (2013.01); *B82Y 30/00* (2013.01); *B29K 2995/0008* (2013.01); *B29K 2105/167* (2013.01); *B29K 2105/162* (2013.01); *B29C 67/24* (2013.01); *C08J 5/06* (2013.01); *C08J 5/24* (2013.01); *B29C 70/62* (2013.01)
USPC ............................ 523/115; 524/431; 523/458

(58) Field of Classification Search
None
See application file for complete search history.

(56) References Cited

U.S. PATENT DOCUMENTS 6,741,019 B1 * 5/2004 Filas et al. .................... 313/355
6,987,302 B1   1/2006 Chen et al.
(Continued)

FOREIGN PATENT DOCUMENTS

DE    10 2007 009124 A1    8/2008

OTHER PUBLICATIONS

Permanent Magnet Materials, MMPA Standard No. 0100-00, 1964.*

*Primary Examiner* — James J Seidleck
*Assistant Examiner* — Peter A Salamon
(74) *Attorney, Agent, or Firm* — Sughrue Mion, PLLC (57) ABSTRACT

A method for making a composite material with non-spherical reinforcing particles embedded in a matrix, is disclosed. In this method, in a first step magnetic and/or superparamagnetic nanoparticles are attached to the non-spherical reinforcing particles, in a second step the resulting reinforcing particles are introduced into a liquid matrix material and/or a liquid matrix-precursor material, and in a third step the material of the matrix is solidified and/or polymerized and/or cross-linked. In accordance with the proposed invention prior to and/or during solidification and/or polymerization and/or cross-linking of the matrix material or the matrix precursor material, respectively, a magnetic field is applied so as to align the reinforcing particles in the matrix and this alignment is fixed in the matrix during and after the third step, wherein the non-spherical reinforcing particles preferably have a length (l) in one dimension of at least 0.5 μm and wherein the weight ratio of the nano-particles to the non-spherical reinforcing particles is below 0.25.

31 Claims, 8 Drawing Sheets

(56) References Cited

U.S. PATENT DOCUMENTS

| | | | |
|---|---|---|---|
| 7,087,207 B2* | 8/2006 | Smalley et al. | 423/447.6 |
| 7,803,262 B2* | 9/2010 | Haik et al. | 204/557 |
| 8,119,021 B2* | 2/2012 | Gogotsi et al. | 252/62.51 R |
| 8,507,032 B2* | 8/2013 | Winarski | 427/547 |
| 8,617,643 B2* | 12/2013 | Crawford | 427/128 |
| 2005/0239948 A1* | 10/2005 | Haik et al. | 524/496 |
| 2006/0068680 A1* | 3/2006 | Perlo et al. | 445/48 |
| 2006/0071586 A1* | 4/2006 | Perlo et al. | 313/316 |
| 2008/0166563 A1* | 7/2008 | Brittingham et al. | 428/411.1 |
| 2008/0286546 A1 | 11/2008 | Lashmore et al. | |
| 2009/0053512 A1* | 2/2009 | Pyun et al. | 428/336 |
| 2009/0117269 A1 | 5/2009 | Hansen et al. | |
| 2009/0280242 A1* | 11/2009 | Winarski | 427/130 |
| 2009/0311506 A1 | 12/2009 | Herbeck et al. | |

* cited by examiner

-R′ = hydrolyzable group, which provides attachment onto solid surfaces. Ex.: -OC$_2$H$_5$; -OCH$_3$, -Cl, etc;

-R = organic fuctional group, which can be used to couple fibers and magnetic nanoparticles;

b)

Dopamine

Nitrodopamine

METHOD FOR THE PRODUCTION OF REINFORCED MATERIALS AND REINFORCED MATERIALS OBTAINED USING THIS METHOD

CROSS REFERENCE TO RELATED APPLICATIONS

This application is a National Stage of International Application No. PCT/EP2011/001381, filed on Mar. 21, 2011, which claims priority from European Patent Application No. 10 003 358.8, filed on Mar. 29, 2010, the contents of all of which are incorporated herein by reference in their entirety.

TECHNICAL FIELD

The present invention relates to methods for making composite materials with non-spherical reinforcing particles embedded in a matrix as well as to composite materials obtained using the method and applications of such composite materials in particular for the reinforcement of fiber-reinforced laminates, adhesion between laminates, medical and dental applications, and structural materials in general for the automobile, aerospace, energy-related and construction industries. In general, it relates to composites with magnetically controlled orientational and spatial distribution of reinforcing particles.

PRIOR ART

Composite materials with non-spherical reinforcing particles embedded in a matrix material are of high importance for many different applications, such as lightweight construction, etc. Typically the non-spherical reinforcing particles are continuous or discontinuous fibres, rovings, platelets, whiskers, rods, tubes etc. One-dimensional particles like fibres, whiskers, rods and tubes have been extensively used to enhance the mechanical strength and stiffness of composites, in particular using polymeric matrices, but the reinforcement provided by each single particle is limited to one specific direction. This limitation has been partly overcome by stacking individual layers of different orientations of one-dimensional reinforcing particles into laminates or by using two-dimensional platelets that enable truly two-dimensional planar reinforcement.

However, deliberate reinforcement in three dimensions remains challenging due to the limited control of the orientation of non-spherical particles in the out-of-plane direction. The lack of reinforcement in this direction makes delamination one of the major causes of failure in advanced composites. Recent attempts to solve this issue include the growth of carbon nano-tubes on the surface of continuous fibres to form perpendicularly aligned reinforcing elements. While the interlaminar strength of fibre-reinforced epoxy-based composites has been increased, current methods lead to limited improvement (typically less than 70%), involve cumbersome synthetic procedures and are limited to reinforcing elements of specific geometries and compositions (e.g. carbon nanotubes). Moreover current methods to prepare particle-reinforced composites do not allow for a deliberate control over the spatial distribution of the reinforcing particles.

US 2005/0239948 discloses the alignment of carbon nanotubes using magnetic particles in order to make a composite material. Carbon nanotubes are provided with magnetic nanoparticles on their surface by means of attaching the magnetic nanoparticles via van der Waals forces between the carbon nanotubes and the nanoparticles. According to this disclosure the attachment in this particular system is sufficient and can be effected by bringing the two materials into intimate contact with one another, for example in a fluid medium such as water. This reinforcing material is mixed with a polymer precursor material and subsequently the matrix is cross-linked. The application of a magnetic field in the range 5000-10000 Gauss to the mixture of the reinforcing material and the polymer precursor material during cross-linking is stated to provide magnetically aligned reinforcing carbon nanotubes in the matrix. However, effective alignment of the nano-tubes requires a minimum weight ratio of 0.5 of magnetic nanoparticles to nano-tubes. The presence of this high concentration of magnetic materials in the final composite severely limits the range of applications of the reinforced material.

SUMMARY OF THE INVENTION

It is therefore an object of the present inventions to propose an improved process for making composite articles with specific reinforcement properties and correspondingly made composite articles.

The process according to the invention involves the following steps: (1) possible surface modification of the reinforcing particles (e.g., platelets, rods, fibers, whiskers, ribbons, tubes) to enable a good adhesion between reinforcing particles and polymer matrix in the final composite, (2) adsorption of magnetic and/or superparamagnetic nanoparticles to the surface of reinforcing particles through van der Waals, electrostatic interactions and/or covalent bonds, (3) magnetic alignment of the reinforcing particles within a solution and/or polymer matrix, (4) setting of the matrix while the magnetic field is applied in order to fix the aligned structure, (5) possible further conditioning of the composite material (annealing, e.g. heat treatment) to provide a good adhesion between reinforcing particle and polymer matrix, (6) possible removal of magnetic nanoparticles by dissolution in acidic solutions.

More specifically, according to the invention the following method for making a composite material with non-spherical reinforcing particles embedded in a matrix is proposed:

in a first step magnetic and/or superparamagnetic nanoparticles are attached to the non-spherical reinforcing particles (this step may be preceded, accompanied or followed by a step of additional surface modification of the non-spherical reinforcing particles in order to make sure that in the final composite there is sufficient adhesion between the reinforcing particles and the surrounding matrix), in a second step the resulting reinforcing particles are introduced into a liquid matrix material and/or a liquid matrix-precursor material (or a matrix material which is at least sufficiently fluid to take up the reinforcing particles yet still allowing their orientation in the below sense), and in a third step the material of the matrix is solidified and/or polymerized and/or cross-linked.

Generally the non-spherical reinforcing particles are preferably essentially non-magnetic. Generally the matrix material is preferentially essentially non-magnetic.

The magnetic and/or super paramagnetic nanoparticles can distributed over the surface of the nonspherical reinforcing particles, they can on the other hand also essentially cover the surface of the nonspherical reinforcing particles as a single layer, and they may also essentially cover the surface of the nonspherical reinforcing particles in multilayer structures.

Specifically now prior to and/or during solidification and/or polymerization and/or cross-linking of the matrix material, or the matrix precursor material, respectively, so prior and/or during above step three, a magnetic field is applied so as to align or locally concentrate the reinforcing particles in the matrix and this alignment is fixed in the matrix after the third step due to the solidification/polymerization/cross-linking of the matrix.

This process is carried out with a weight ratio of the magnetic and/or superparamagnetic nano-particles to the non-spherical reinforcing particles lower than 0.25. The weight ratio here is defined as (mass of magnetic and/or superparamagnetic nano-particles)/(mass of non-spherical reinforcing particles).

Figure 10:
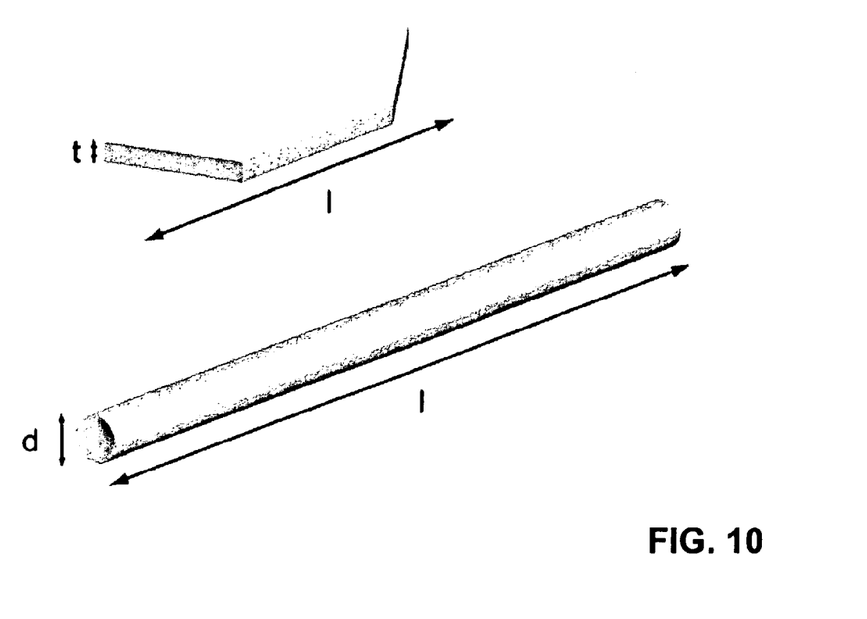
FIG. 10 schematic representation of the reinforcing particles, wherein in the upper part a two-dimensional reinforcing particle is shown, namely in the form of platelets/ribbons and the corresponding dimensions are indicated, and in the lower part a one-dimensional reinforcing particle is given and the dimensions of a fibre/rod/tube/whisker are indicated.

FIG. 10 schematically illustrates a two-dimensional reinforcing particle (upper part) and a one-dimensional reinforcing particle (lower part) and the corresponding designation of the dimensions as used in this description.

Indeed unexpectedly it was found that even for large non-spherical reinforcing particles, which are much larger than the magnetic and/or superparamagnetic nano-particles (the magnetic and/or superparamagnetic nano-particles are generally to be understood as being spherical or nonspherical particles with average diameters in the range of 1-200 nm), it is possible to work with comparably low magnetic and/or superparamagnetic nano-particle loading, i.e. with a low weight ratio of the magnetic and/or superparamagnetic nano-particles to the non-spherical reinforcing particles of below 0.25. As the magnetic and/or superparamagnetic nano-particles are actually only used as a tool for the orientation but are not normally functionally required during subsequent use of the composite material (for many applications they are even detrimental), and as there is also manufacturing and environmental reasons to keep the magnetic and/or superparamagnetic nano-particle content as low as possible, this is a major advantage provided by the present invention. Magnetic orientation allows for essentially unlimited tailoring of the spatial distribution of the reinforcing particles in the matrix and correspondingly allows for essentially unlimited tailoring of the reinforcing properties. In particular it is possible to orient the reinforcing particles in the matrix, e.g. in the case of stratified structures, in a direction essentially perpendicular or at an angle different from 90° to the plane of the stratified structure of the composite material. This allows the reinforcing in directions which hitherto were not available with the same ease. Furthermore due to the very low magnetic and/or superparamagnetic nano-particle content it is also possible to actually remove the nanoparticles subsequent to the solidification step as will be detailed further below.

According to a preferred embodiment, and this is particularly advantageous because it reduces production difficulties, much lower magnetic fields are applied to align or locally concentrate the reinforcing particles. Preferentially, a magnetic field of less than 5000 Gauss, preferably less than 500 Gauss can be applied as opposed to a minimum field necessary in the range of 5000 Gauss in state-of-the-art. In principle, with a lower proportion of magnetic and/or superparamagnetic nanoparticles, it would appear that one would need higher fields. Unexpectedly, even lower fields are needed than required with higher concentrations of magnetic and/or superparamagnetic nanoparticles and, without being bound to any theoretical explanation, it seems that an optimum ratio of magnetic and/or superparamagnetic particles and reinforcing particles seems to have been found for orientation purposes. Without being bound to any theoretical explanation, the lower magnetic fields and lower concentration of magnetic and/or superparamagnetic particles required to achieve alignment of the reinforcing elements might be related to the efficient dispersion of the reinforcing particles in the fluid matrix, which reduces steric hindrance effects and the formation of agglomerates that would tend to resist alignment.

According to a preferred embodiment, the non-spherical reinforcing particles have an average length (l) in one dimension of at least 0.5 µm. This in particular applies to one-dimensional non-spherical reinforcing particles, so to reinforcing particles which are essentially fibres, rods, tubes are whiskers. In case of two-dimensional non-spherical reinforcing particles, so for platelets or the like, a minimum average length of the longest axis of the reinforcing particle can also be below this value, so for example above 10 nm.

According to a first preferred embodiment of the invention, the non-spherical reinforcing particles are selected from the group of one-dimensional reinforcing particles, so preferably from the group of fibres, rods, tubes or whiskers or combinations thereof with an average diameter (d) in the range of 1 nm-1 mm, preferably in the range of 1 µm-100 µm, with the proviso that the length (l) is at least twice, preferably at least five times as large as the diameter (d).

The shape of the cross-section of these one-dimensional reinforcing particles can be circular, but also different cross-sectional shapes are possible such as rectangular, square, cocoon, oval shapes etc. It is also possible for some applications to go for aggregates of such particles.

According to yet another preferred embodiment of the invention, the non-spherical reinforcing particles are two-dimensional reinforcing particles, preferably selected from the group of platelets, ribbons or combinations thereof with a thickness (t) in the range of 1 nm-10 µm, preferably in the range of 50 nm-1000 nm and preferably with a width (w) in the range of 10 nm-100 µm, with the proviso that the length (l) is at least twice, preferably at least five times larger than the thickness (t) and with the proviso that the width (w) is larger than the thickness (t), preferably at least twice as large as the thickness (t). Again the cross-sectional area in a direction to the length can be rectangular but it can also be oval or ellipsoid, the above values for the thickness and the width corresponding to the main axes of such shapes. The numerical values given correspond to average values. According to a further preferred embodiment, a combination of one-dimensional and two-dimensional reinforcing particles is used. Generally speaking, different types of one-dimensional reinforcing particles can be used in one composite material as well as different types of two-dimensional reinforcing particles in order to tailor the reinforcing particles, but also combinations of one-dimensional and two-dimensional reinforcing particles.

Preferentially, the weight ratio of the magnetic and/or superparamagnetic nano-particles to the non-spherical reinforcing particles is in the range of 0.00001-0.10, preferably in the range of 0.0001-0.05. In particular with these low magnetic and/or superparamagnetic nano-particle loadings still very high orientational order can be generated.

Generally speaking, for the orientation-step a magnetic field in the range of 1-5000 Gauss, preferably in the range of 5-2000 Gauss, more preferably in a range below 1000 Gauss, most preferably in the range of 5-500 Gauss is applied, wherein the necessary strength of the magnetic fields for proper alignment depends on factors such as viscosity of the matrix, setting time of the matrix, magnetic properties and size of the nano-particles, size of the reinforcing particles etc. Such a magnetic field has to be applied for a timespan sufficient to align the reinforcing particles in the matrix. Typically application of a magnetic field in the above range for a timespan of a few seconds to a few minutes, while the matrix is still liquid/sufficiently fluid, is sufficient.

According to a further preferred embodiment, the magnetic and/or superparamagnetic nano-particles are attached to the non-spherical reinforcing particles by van der Waals, electrostatic and/or covalent attachment, preferably the attachment is electrostatic and/or covalent, as this allows a much more firm attachment and a much more efficient alignment with high magnetic fields and/or under more difficult matrix conditions.

It was found that for quite a number of systems (combinations of matrix material/reinforcing particle materials) the actual reinforcing effect can be significantly enhanced if after or during the above step 3 an additional step or mechanism is provided in order to make sure there is sufficient adhesion between the reinforcing particles and the surrounding matrix. Indeed it is known that an optimum adhesion between reinforcing particles and matrix is crucial to enable efficient reinforcement by stress transfer from the matrix to the reinforcing particles.

According to yet another preferred embodiment therefore, subsequent to the third step or within the third step the non-spherical reinforcing particles are bonded and/or attached to the surrounding matrix material, preferably by a subsequent fourth annealing step with heat treatment and/or irradiation treatment and/or pressure treatment. These treatments can be made possible and effective by the above-mentioned treatment of the reinforcing particles prior to the embedding in the matrix in order to provide for this adhesion. If for example the reinforcing particles are provided with a coating or a surface treatment prior to, during or after step 1 of the above process, this coating or surface modification for example having corresponding functional chemical groups, can be covalently linked to the matrix or linked to the matrix via hydrogen bonds or the like.

In case of heat treatment of polymeric matrix materials heat treatment temperatures well below the melting temperature are chosen, typically at least 10° C., preferably at least 25° C. below the melting temperature.

As mentioned above, the non-spherical reinforcing particles can be platelets, fibres, whiskers, rods, tubes, ribbons, wherein preferably such structures are made of or based on metallic, ceramic, polymeric or composite materials, preferably selected from alumina platelets, gibbsite platelets, clay platelets, talc platelets, mica platelets, glass platelets, silicon carbide platelets, aluminum boride platelets, graphite platelets, aluminum platelets, copper platelets, glass fibres, polymer fibres, carbon fibers, silicon carbide whiskers and silicon nitride whiskers.

As mentioned above, the magnetic and/or superparamagnetic nano-particles can be attached to the non-spherical reinforcing particles by electrostatic attachment. This is possible according to a preferred embodiment by immersing the magnetic and/or superparamagnetic nano-particles and the non-spherical reinforcing particles in a fluid, preferably in water, under conditions such that the non-spherical reinforcing particles and the magnetic and/or superparamagnetic nano-particles have opposite charge, wherein the charges are strong enough such that the energy of electrostatic attraction is larger than thermal energy when the particles are close to each other, typically tens of nanometers apart. Preferably, if the fluid is water, the opposite charge is generated by adapting the pH of the solution to a value above the isoelectric point of one element and below the isoelectric point of the other element (an element being the magnetic and/or superparamagnetic particle or the reinforcing particle, respectively).

According to yet another preferred embodiment, the non-spherical reinforcing particles are coated with a material allowing for the generation of charged non-spherical reinforcing particles if immersed in water.

Furthermore the magnetic and/or superparamagnetic nanoparticles can be coated with a material allowing for the generation of charged magnetic and/or superparamagnetic nanoparticles if immersed in water.

In addition to that or in the alternative, the non-spherical reinforcing particles can be coated with a material allowing for bonding and/or attachment of the non-spherical reinforcing particles during the third step and/or during a subsequent annealing step.

According to a further preferred embodiment, the liquid matrix material and/or the liquid matrix-precursor material is a cross-linkable and/or non-cross-linkable polymeric material, a polymer precursor material or a ceramic (precursor) material. Preferably it is selected from the group of polyurethanes, polyethylenes, polypropylenes, polyamides, polyesters, epoxies, polyimides, poly(ether ether ketone), poly(tetra fluorethylene), poly(ethylene terephthalate), poly(vinyl alcohol), as well as natural compounds such us chitosan, agarose, gellan gum, gelatine, collagen, natural rubber, starch and alginate. Also possible matrix materials are metals and ceramics. The addition and alignment of reinforcing particles in steels, metal alloys or ceramics (e.g. tungsten carbide) leads to harder cutting tools for example.

Subsequent to the third step and/or subsequent to a fourth annealing step the magnetic and/or superparamagnetic nanoparticles can, as mentioned above, selectively be removed from the matrix. Indeed removal of the magnetic and/or superparamagnetic nano-particles can be desirable for reasons such as colour induced by the magnetic and/or superparamagnetic nano-particles, but also for chemical and/or physical reasons. Unexpectedly removal of the magnetic and/or superparamagnetic nano-particles out of the solidified matrix with the oriented reinforcing particles embedded therein is possible without imparting or even destroying the orientation of the reinforcing particles.

Removal of the magnetic and/or superparamagnetic nano-particles can for example be effected by treating the composite material with an acidic fluid, wherein preferably the acidic fluid has a pH-value below 3, preferably below 1, and wherein the treatment takes place at a temperature preferably 10-30° C. below the melting point of the matrix, more preferably below 30° C.

Preferentially, the treatment takes place for a timespan of less than 48 hours, preferably of less than 10 minutes.

Preferentially the acidic fluid removal of the magnetic and/or superparamagnetic nanoparticles is an aqueous solution of nitric acid, sulphuric acid or phosphoric acid, preferably with a pH in the range of 0-3.

As mentioned above, the proposed method allows tailoring of the actual reinforcing properties by means of tailoring the distribution of the reinforcing particles in the matrix. This can be effected in that prior to and/or during the third step a magnetic field is applied so as to lead to an inhomogeneous distribution of the reinforcing particles. This inhomogeneous distribution can be a variable concentration of the reinforcing particles as a function of the location in the matrix. It can also be a variable orientational distribution of the reinforcing particles as a function of the location in the matrix. It can also be a combination of the two, namely a combination of variable concentration and variable orientational distribution in the material.

Furthermore the present invention relates to a composite material with non-spherical reinforcing particles embedded in a matrix, obtainable and/or obtained using a method as outlined above.

According to a first preferred embodiment of this composite material, the non-spherical reinforcing particles are magnetically aligned in the matrix material of the composite material, wherein preferably there is an inhomogeneous distribution (in the sense of concentration or in the sense of orientation as a function of location in the matrix) of the non-spherical reinforcing materials in the matrix.

According to a specific preferred embodiment of the composite material in accordance with the invention, the composite material takes the shape of a coating or a film, and the non-spherical reinforcing particles are on average arranged in the matrix with the long axis essentially perpendicular to the plane of the coating and/or film (or at least at an angle larger than 45° with respect to the plane).

According to a further specific preferred embodiment of the composite material, the composite material is essentially free from magnetic and/or superparamagnetic nano-particles. This is possible by the above-mentioned additional step of subsequent removal of the magnetic and/or superparamagnetic nano-particles from the matrix.

Last, the present invention relates to the use of a composite material according to the description given above as construction material and/or an adhesive layer and/or a surface coating or surface film and/or as an intermediate layer in a laminate and/or a scratch-resistant lamina and/or a dental restoration and/or an artificial scaffold for tissue regeneration, preferably with an orientational distribution of the non-spherical reinforcing particles e.g. in a plane perpendicular to the plane of the layer, preferably for applications such as automobile construction, aerospatial construction, biomedical implants, dental restorations, strengthened glues and adhesives, cutting tools.

Further embodiments of the invention are laid down in the dependent claims.

Typical materials to be used in accordance with the invention are as follows:

This method for 3D reinforcement of matrices through magnetically controlled spatial and orientational distribution of reinforcing elements is general and can be applied to a variety of reinforcing particles and matrix materials as well as different types of magnetic and/or superparamagnetic nano-particles. The following materials can be used:

a. Reinforcing Particles

The method applies generally to non-spherical reinforcing particles including, but not limited to, the following: alumina platelets, glass fibers, clay particles, carbon fibers, Kevlar fibers, polyethylene fibers, cellulose fibers. The main requirement is that the particles exhibit anisotropy in shape in at least one axis. For example, they can be rods, platelets, fibers, whiskers, tubes, ribbons, ellipsoids, etc b. Magnetic and/or Superparamagnetic Nanoparticle Materials The method applies generally to magnetic and/or superparamagnetic nanoparticles including, but not limited to, the following: iron oxide (such as $Fe_3O_4$, $Fe_2O_3$), cobalt, nickel, and derived alloys. These magnetic and/or superparamagnetic nanoparticles must be responsive to an applied magnetic field. Also, the magnetic and/or superparamagnetic nanoparticles are generally in the size range of 1-200 nm in diameter.

c. Matrix Materials

The method applies generally to a variety of matrices including, but not limited to, the following: thermoplastic and thermoset polymers, ceramics and metals.

In one typical example iron oxide nanoparticles are adsorbed onto aluminum oxide platelets. Subsequently, these platelets are added to a thermoplastic polymer, such as polyurethane. In another example, glass fibers can be pretreated with cobalt nanoparticles and then added to a thermoset polymer, such as a commercial epoxy.

The main steps of the process are as follows:

1. Surface Modification of Reinforcing Particles (Optional)

The surface chemistry of the reinforcing particles is preferably tailored in order to obtain a strong adhesion between reinforcing particles and the polymer matrix and to therefore effectively attain a high level of reinforcement in the final composite. This can be accomplished by coating the reinforcing particles with short molecules, ions and/or polymers that can provide strong adhesion between reinforcing particles and polymer matrix through van der Waals forces, electrostatic forces or even covalent bonds. Here are a few examples of possible surface modification procedures:

a. Covalent interfacial bonding via small molecules: silane molecules containing an amine functional group (e.g. 3-aminopropyltriethoxysilane—APTES) can be used to coat the surface of metal oxide reinforcing particles (e.g. $Al_2O_3$, $SiO_2$, $TiO_2$, $ZrO_2$, etc) and afterwards establish a covalent bond with another functional group of the polymer matrix (e.g. epoxy, isocyanate, carboxylic acid, etc.). Alternatively, other short molecules like for example nitrodopamine or dopamine can adsorb onto the surface of the reinforcing particles via strong ligand exchange reactions and also provide an amine functional group to establish covalent bonds with functional groups of the polymer matrix (e.g. epoxy, isocyanate, carboxylic acid, etc.).

b. Noncovalent interfacial bonding via small molecules: Short-chain molecules adsorbed on the reinforcement surface can be used to mimic intermolecular forces found in the polymer matrix itself (e.g. van der Waals and hydrogen bonding forces), so as to provide a good stress-transfer from the polymer matrix to the reinforcing particles while allowing for extensive plastic deformation of the matrix when the shear strength of the polymer is achieved. For instance, reinforcing particles modified with small amine-containing molecules like APTES, nitrodopamine or dopamine can be incorporated in amine-based matrices to provide good adhesion between reinforcement and polymer matrix without any chemical reaction between surface and matrix functional groups.

c. Grafting preformed polymers ("graft to" approach): using the "grafting to" approach, macromolecules like for example poly(vinyl pyrrolidone) (molecular weight in the range 40.000-1.300.000 g/mol) can be electrostatically adsorbed on the surface of the reinforcing particles to afterwards obtain strong interfacial adhesion via physical entanglements between the adsorbed macromolecules and the polymer matrix. High molecular weight molecules can also be covalently attached to reinforcing particles using for example PEGylation reactions. For instance, polyethylene glycol with different molecular weights (PEG) can react with tetrachlorosilane, which can be further covalently adsorbed onto the reinforcing particles through the remaining hydrolyzable groups, providing a polymer chain covalently attached to the surface. This polymeric chain also provides physical entanglements with the polymer matrix, contributing to the stress transfer at the interface reinforcement-matrix.

d. Polymerization from surface-adsorbed small molecules ("graft from" approach): polymer chains can be covalently attached on the particle surface using the "grafting from" approach where polymer chains are induced to grow from the reinforcement surface. Examples of this procedure include the adsorption of a polymerization reaction catalyst and/or initiator on the particle surface to afterwards carry out a polymerization reaction in the presence of those modified particles. In case of polyurethanes for example, tin octoate can be used as catalyst, and toluene diisocyanate and polytetrahydrofuran as monomers for the "in situ" polymerization. In another example, catechol or pyrogallol-based molecules with an amine functional group (e.g. nitrodopamine, dopamine) can be used to coat the surface of oxide particles through ligand exchange reactions and to establish covalent bonds to the polymer matrix by reacting the amine group with carboxylic acid groups from the matrix polymer, using the well-established carbodiimide chemistry for carboxylic acid activation. In another example, reinforcing particles can be functionalized with perfluorophenylazide, which afterwards reacts with for example polystyrene, poly(2-ethyl-2-oxazoline), poly(4-vinylpirydine), polyimide through photopolymerization processes.

e. Bare surfaces containing polar groups: for certain matrix polymers good adhesion between the reinforcing particles and the matrix can also be achieved by a thermal treatment of the final composite, which induces crystallization of polar segments of the polymer on the surface of the reinforcement.

2. Adsorbing Magnetic and/or Superparamagnetic Nanoparticles to Reinforcing Particles.

The magnetic and/or superparamagnetic nanoparticles can be adsorbed to the reinforcing particles through electrostatics, van der Waals or through covalent bonds.

a. Electrostatic Adsorption of Magnetic and/or Superparamagnetic Nanoparticles to Reinforcing Particles To employ electrostatic adsorption it is important that the electrostatic surface charge of the fibers and the nanoparticles are opposite, (one is negatively charged and one is positively charged). Opposite charges can be achieved by either selecting reinforcing particles and nanoparticles with an opposite natural surface charge at a given pH or by altering, through chemical treatment or coatings, the surface charge of one or both of these elements. Both cationic and anionic magnetic and/or superparamagnetic nanoparticles are commercially available, such as the respective EMG-605 and EMG-705 ferrofluids from the company Ferrotec.

Figure 1:
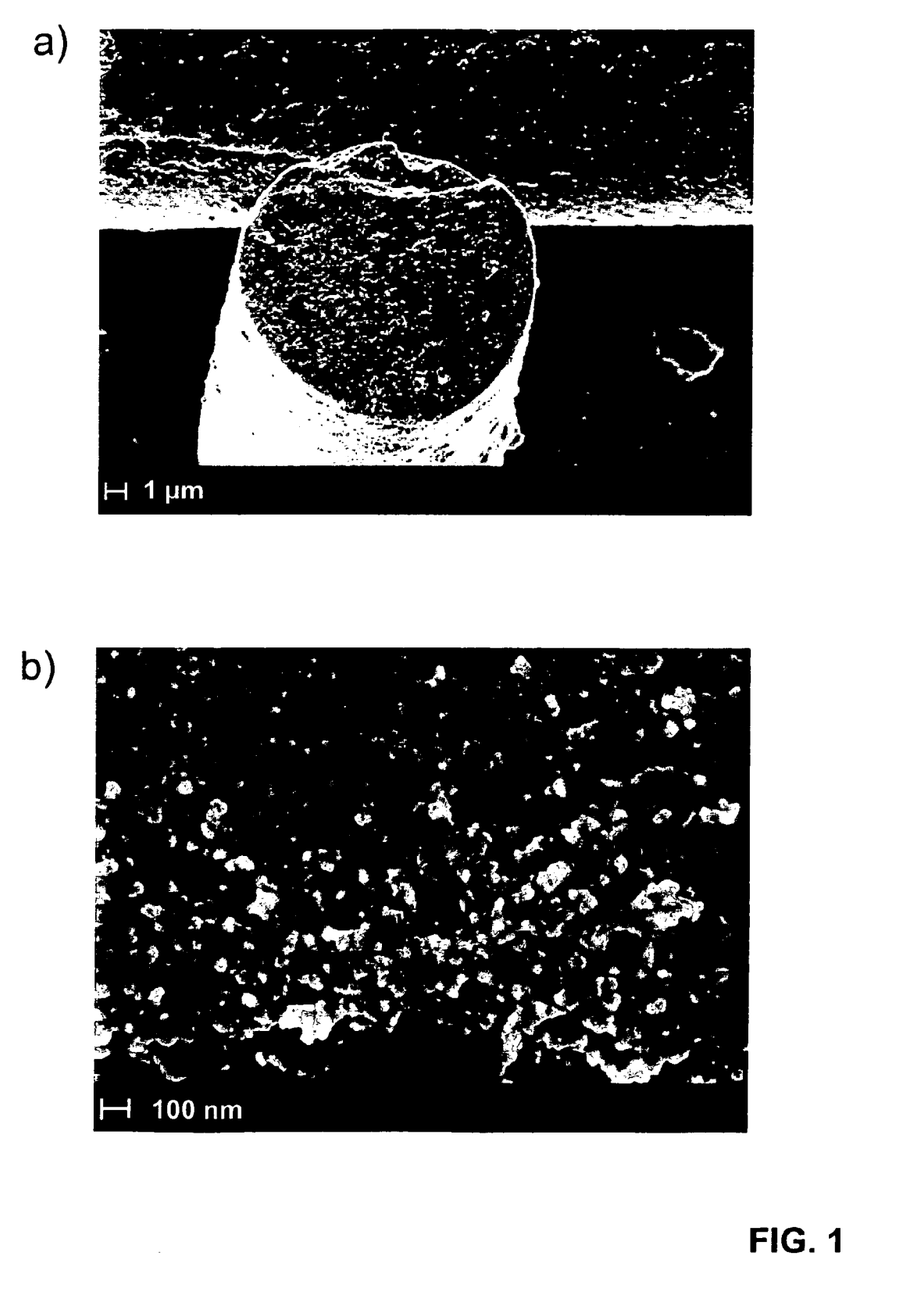
FIG. 1 shows (a) Glass microrods (roughly 50 μm in length by 10 μm in diameter) with electrostatically adsorbed iron oxide nanoparticles. (b) 50 nm iron oxide nanoparticles under higher magnification.

One example is to suspend 50 nm commercial iron oxide nanoparticles, such as from Nanostructured and Amorphous Materials Inc., in water with a pH of 4 to give them a naturally positive charge. Upon adding glass fibers to this solution, such as those commercially available from Fibre Glast Development Corporation, the fibers will exhibit a natural negative surface charge. Through electrostatics, the magnetic and/or superparamagnetic nanoparticles will then adsorb to the fibers under these conditions, as shown in FIG. 1.

Figure 2:
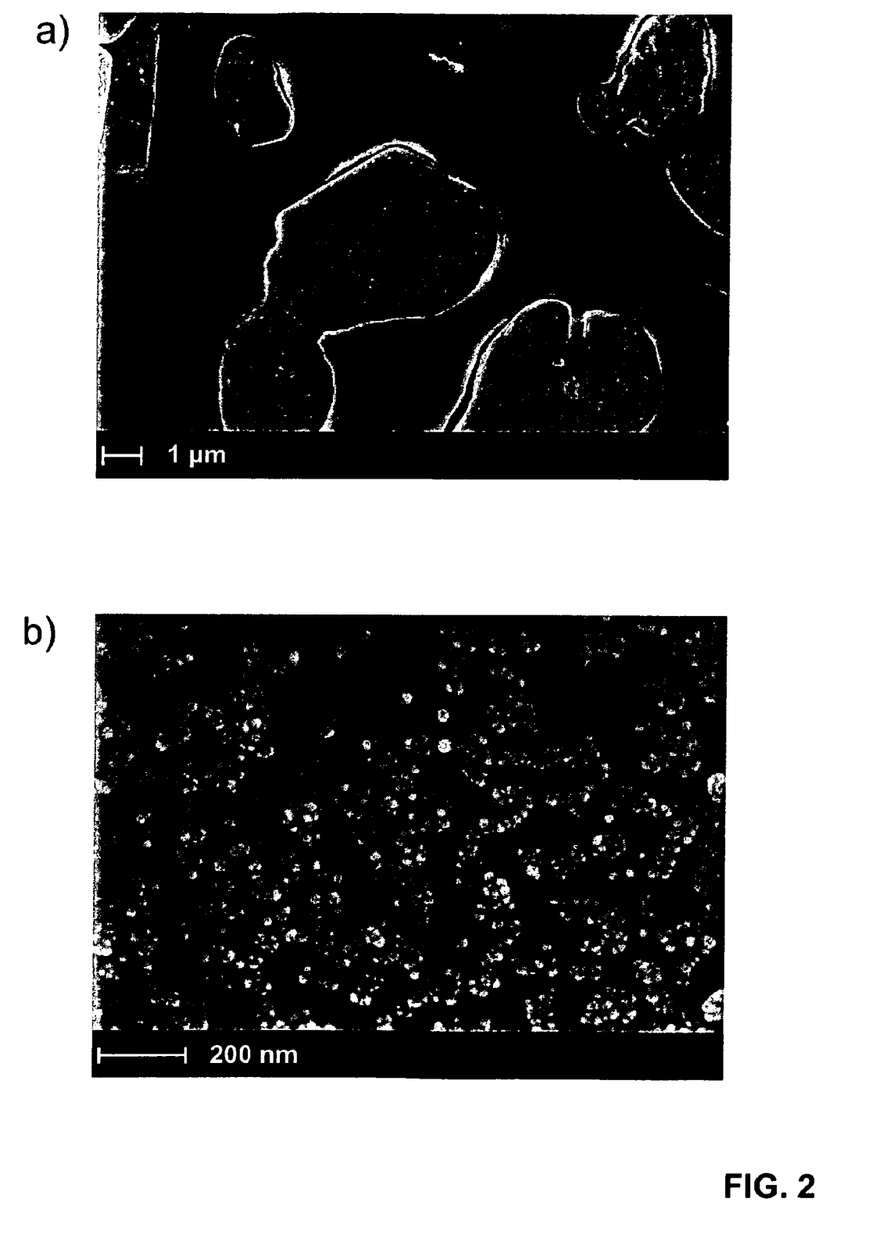
FIG. 2 shows (a) Aluminum oxide platelets (roughly 7.5 μm in diameter and 200 nm in thickness) which have electrostatically adsorbed iron oxide nanoparticles. (b) Under higher magnification the 12 nm iron oxide nanoparticles.

Another example is to use treated iron oxide nanoparticles coated with surfactants that provide an anionic surface charge, such as that available to purchase from commercial sources, such as the EMG-705 solution from Ferrotec. These nanoparticles will electrostatically adsorb at neutral pH to aluminum oxide platelets, such as those commercially available from Antaria (grade Al-Pearl), which are naturally cationic at pH of 7. See FIG. 2.

Figure 3:
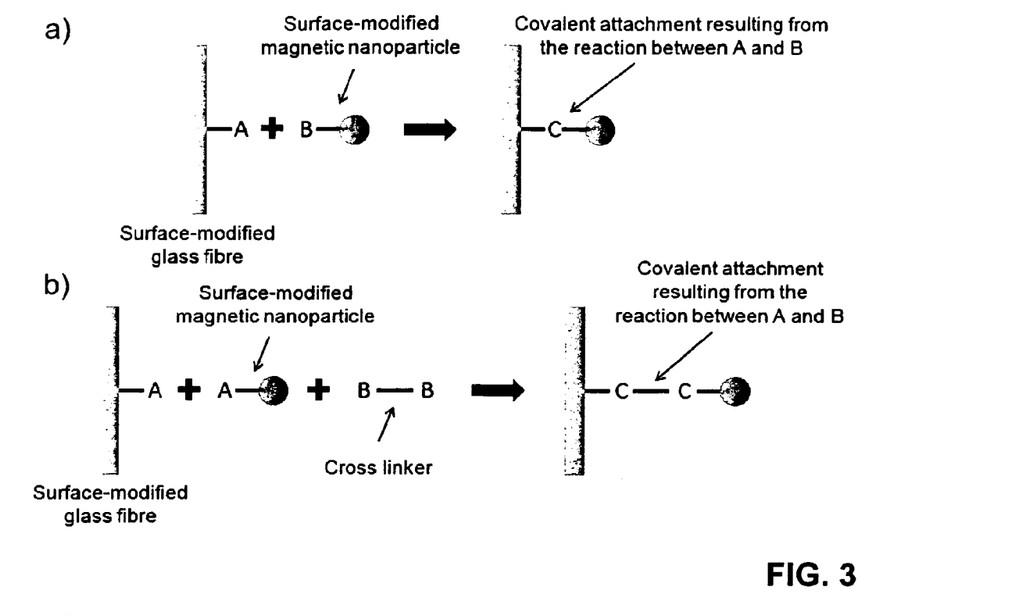
FIG. 3 shows strategies for covalent binding magnetic nanoparticles to Fibers. (a) The reaction between the complementary functional groups located on the fiber and magnetic nanoparticle surface lead to the formation of a covalent bond. (b) A cross linker can be used to covalently couple a fiber and a magnetic nanoparticle which contain the same functional group.

In another example, ionic surfactants and/or polymeric molecules can be adsorbed in a layer-by-layer fashion in order to provide strong adsorption of the magnetic and/or superparamagnetic nanoparticles on the surface of the reinforcing particles. Reinforcing carbon nanotubes for instance can be first coated with the anionic polymer poly (sodium 4-styrene sulfonate), followed by the electrostatic adsorption of the cationic polymer poly(dimethyldiallylammonium chloride) and finally the adsorption of negatively charged magnetic and/or superparamagnetic nanoparticles as those commercially available from Ferrotec.

b. Covalent Binding of Magnetic and/or Superparamagnetic Nanoparticles to Reinforcing Particles The magnetic and/or superparamagnetic nanoparticles can also be attached to the surface of the reinforcing particles through covalent bonds. To achieve this, reinforcing particles and magnetic and/or superparamagnetic nanoparticles must be surface modified with appropriate organic functional groups. Covalent bonds can be formed either by direct reaction between those functional groups or by using a cross linking agent, as schematically exemplified in FIG. 3.

Figure 4:
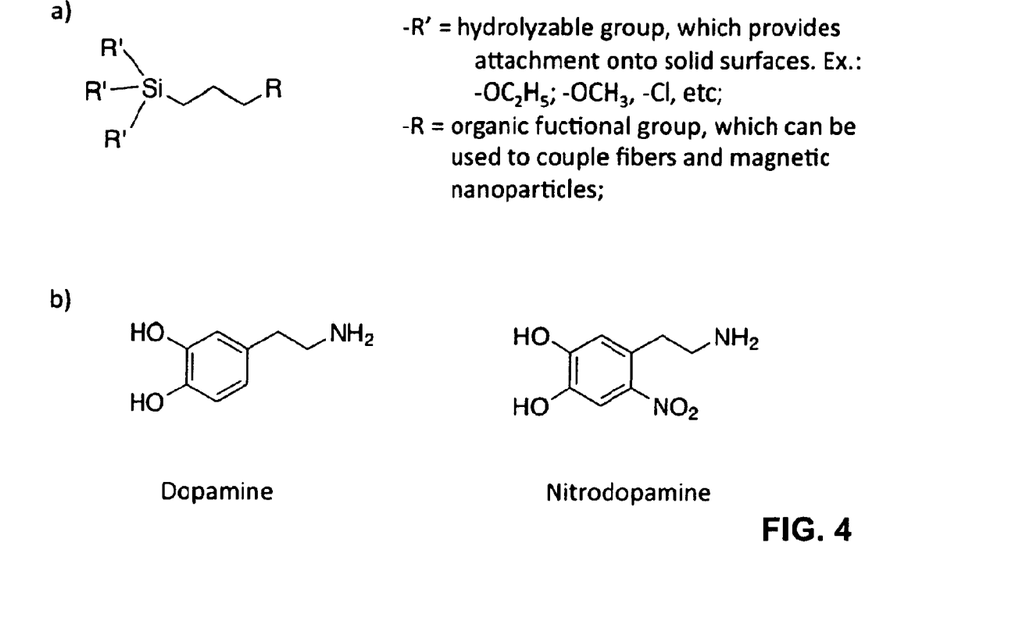
FIG. 4 shows organic molecules which can be used to provide covalent bond between fibers and magnetic nanoparticles. (a) Silane coupling agents. (b) Catechol-based molecules.

The surface modification of metal oxide reinforcing particles (e.g. glass fibers and alumina platelets) can be performed using silane coupling agents (FIG. 4a), which are commercially available from Aldrich and Gelest Co. Cathecol- and pyrogallol-based molecules can also be used to provide organic functional groups on metal oxide surfaces. For instance, dopamine and nitrodopamine, supplied by Aldrich and Surface Solutions Gmbh respectively, can attach strongly to alumina surfaces providing free amine groups (FIG. 4b), which can be further used for coupling magnetic and/or superparamagnetic nanoparticles through covalent bonds.

Figure 5:
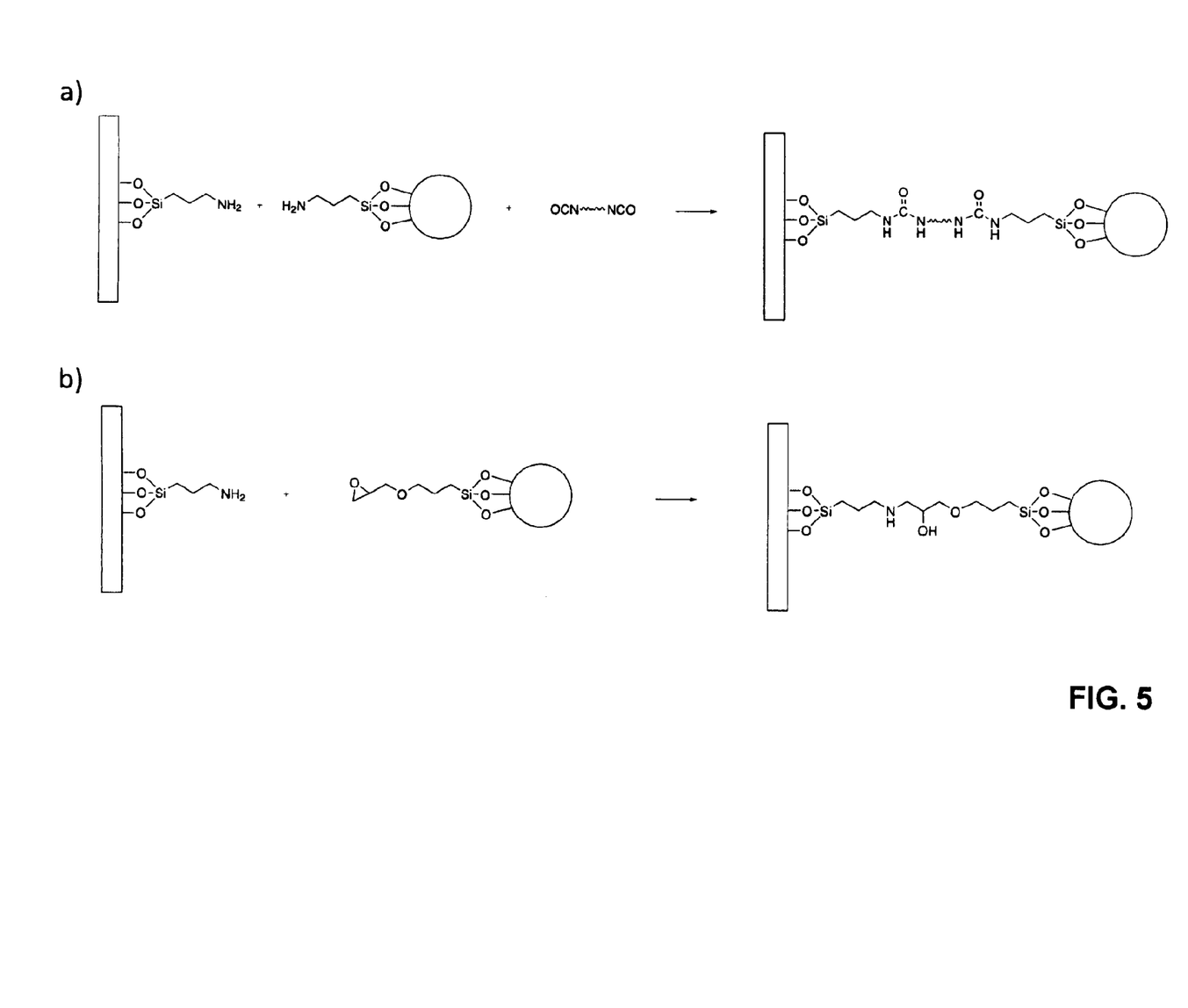
FIG. 5 Examples of covalent binding using silanes. a) coupling by using cross linker molecules. b) coupling by using complementary functional groups.

One example is to use an amine silane to modify both the glass fiber and the magnetic and/or superparamagnetic nanoparticle surface. In this case, a diisocyanate can be used as a crosslinker, coupling the magnetic and/or superparamagnetic nanoparticle to the glass fiber surface (FIG. 5a). Another example is to use an amine and an epoxy silane to modify the glass fiber and the magnetic and/or superparamagnetic nanoparticles respectively. As these groups can react with each other, a covalent bond can be formed linking the magnetic and/or superparamagnetic nanoparticle onto the glass fiber surface (FIG. 5b). In the same way, a cathecol-based molecule can also be used to provide amine groups. Alternatively, carbodiimide chemistry can be used to covalently bind amine groups from one surface to carboxylic acids groups from the other surface.

c. Adsorption of Magnetic and/or Superparamagnetic Nanoparticles to Reinforcing Particles Through Attractive van der Waals Forces Magnetic and/or superparamagnetic nanoparticles can also be adsorbed on the surface of reinforcing particles through van der Waals interactions. In one example, negatively charged magnetic nanoparticles (Ferrotec) and negatively charged alumina platelets (Antaria) are first mixed to form a well-dispersed suspension at pH 10. A salt (e.g. NaCl) is then added to the suspension at concentrations higher than the critical coagulation concentration (e.g. 0.3 M) to screen the electrostatic double layer around particles and therefore promote the adsorption of the magnetic nanoparticles on the surface of the alumina platelets by van der Waals attractive forces.

Figure 6:
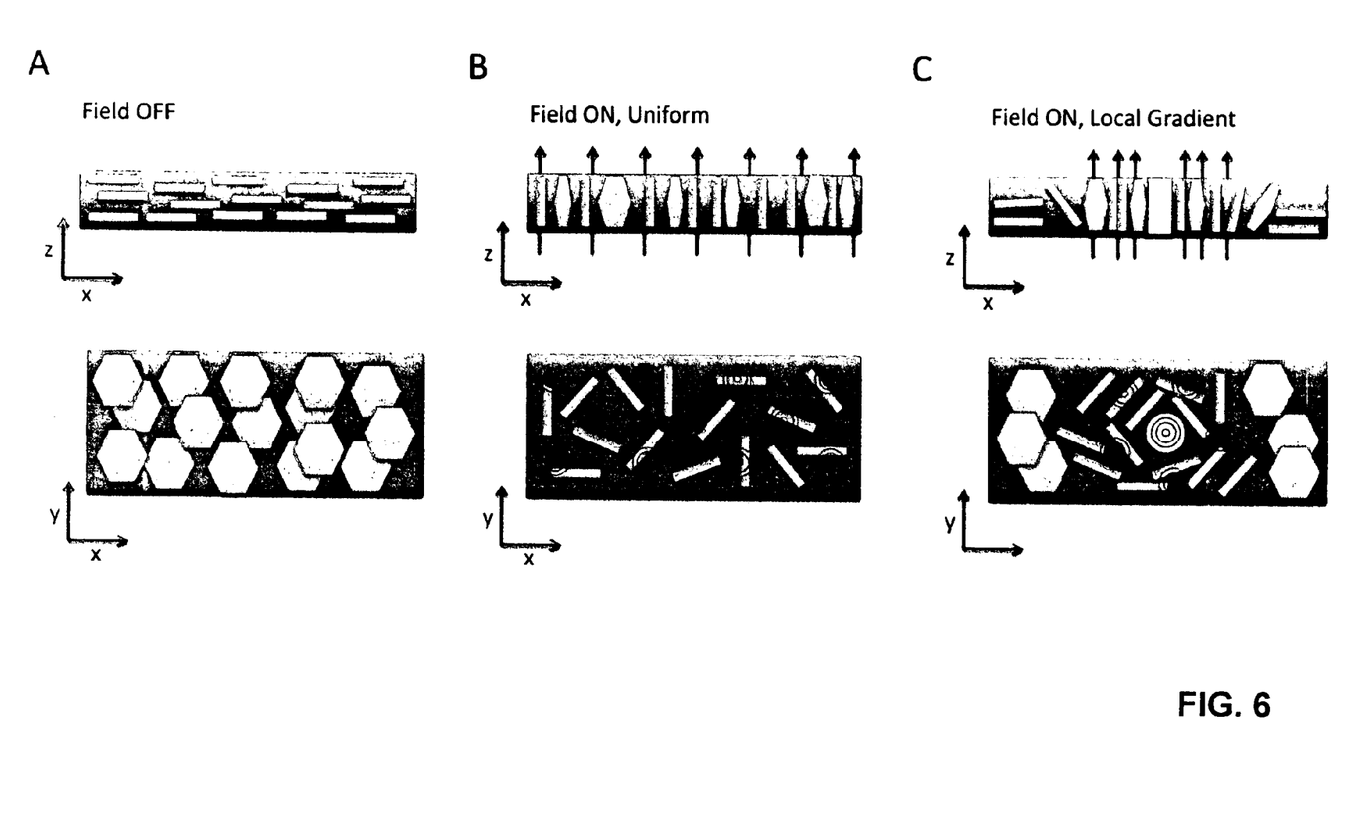
FIG. 6 Illustrative examples of possible configurations of magnetized platelets are depicted. In (a), no applied field allows the magnetized platelet to orient in a standard configuration, parallel to the film. In (b), a uniform vertical field is applied which orients the platelets perpendicular to the film. In (c), a magnetic field is applied locally around a hole in the matrix. The field orients local platelets. In addition, the local field applies a gradient that spatially clusters platelets locally around the affected area.

3. Orientational and Spatial Control of Reinforcing Particles with an Applied Magnetic Field After adding the reinforcing particles coated with magnetic and/or superparamagnetic particles into the matrix, the reinforcing particles will align in an external magnetic field. Different orientational and spatial combinations of the reinforcing particles are possible by modulating (1) the percentage of reinforcing particles with adsorbed magnetic and/or superparamagnetic nanoparticles to reinforcing particles without magnetic nanoparticles, (2) the strength of both the applied external field and the field gradient, and (3) the time allowed for the setting of the matrix.

a. Possible Orientational and Spatial Configurations of Magnetized Reinforcing Particles By applying a magnetic field different orientational and spatial configurations of the reinforcing particles are possible, as exemplified in FIG. 6.

b. Application of Magnetic Field

To properly orient the reinforcing particles through an applied magnetic field, the field needs to provide a torque on the particle that overcomes competing forces, such as gravity, thermal motion or steric hinderance. In general moderate magnetic fields in the range of 1-5000 Gauss are strong enough to orient fibers and platelets. Such magnetic fields can either be applied with solenoids or with permanent magnets. Stronger magnetic fields, such as those produced with NMR/MRI machines, are not required but can also be employed.

Figure 7:
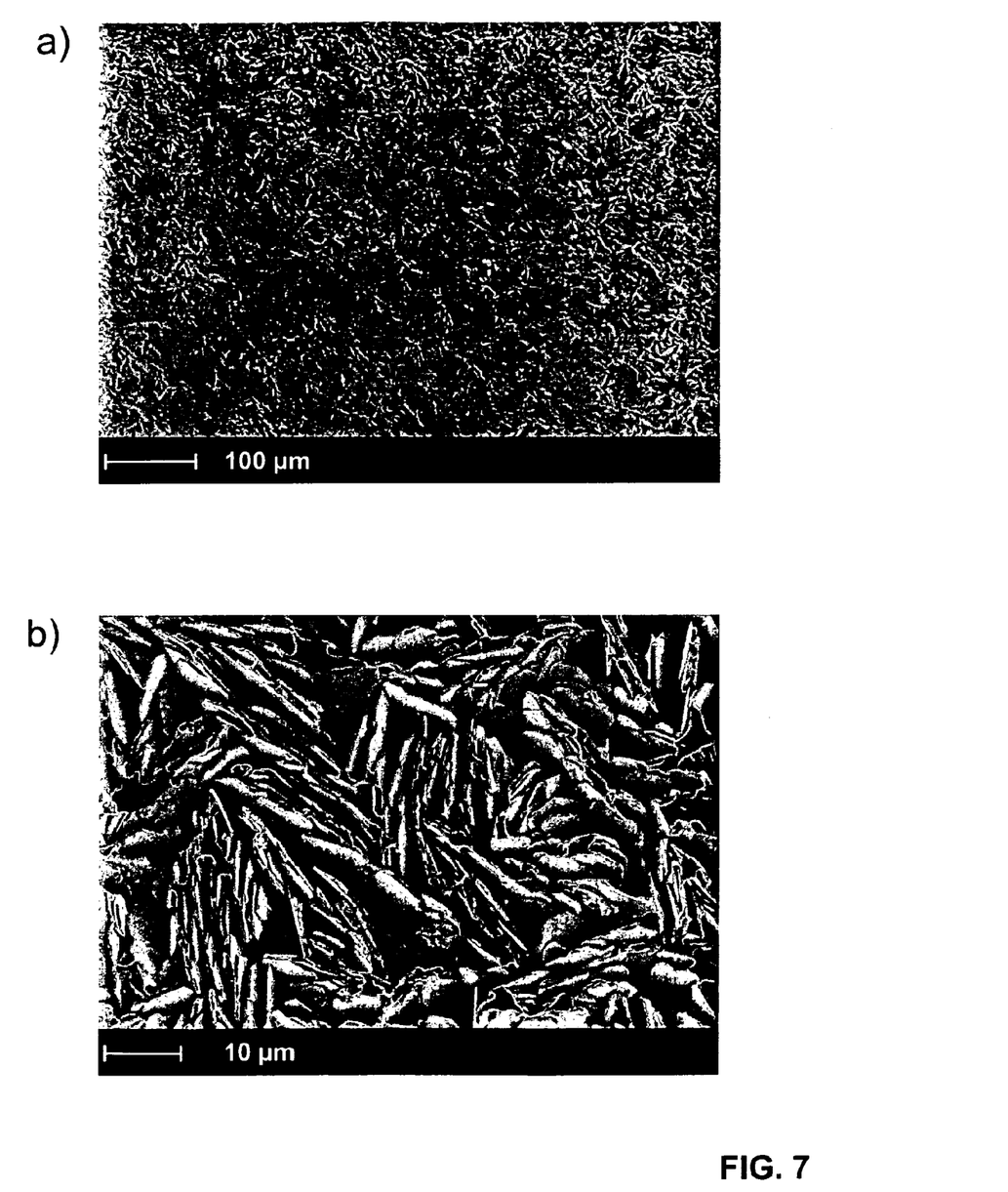
FIG. 7 Platelet reinforcement with adsorbed magnetic nanoparticles are oriented perpendicular to the matrix surface in an applied magnetic field. Shown here are aluminum oxide platelets with adsorbed iron oxide nanoparticle in polyurethane.

For example, aluminum oxide platelets with adsorbed iron oxide nanoparticles in a thermoplastic polymer such as polyurethane will orient under 400 Gauss magnetic field, as shown in FIG. 7. This field can be applied with commercially available permanent magnets, such as those from the company Supermagnete.

c. Modulating the Ratio of Magnetized to Unmagnetized Reinforcing Particles

Figure 8:
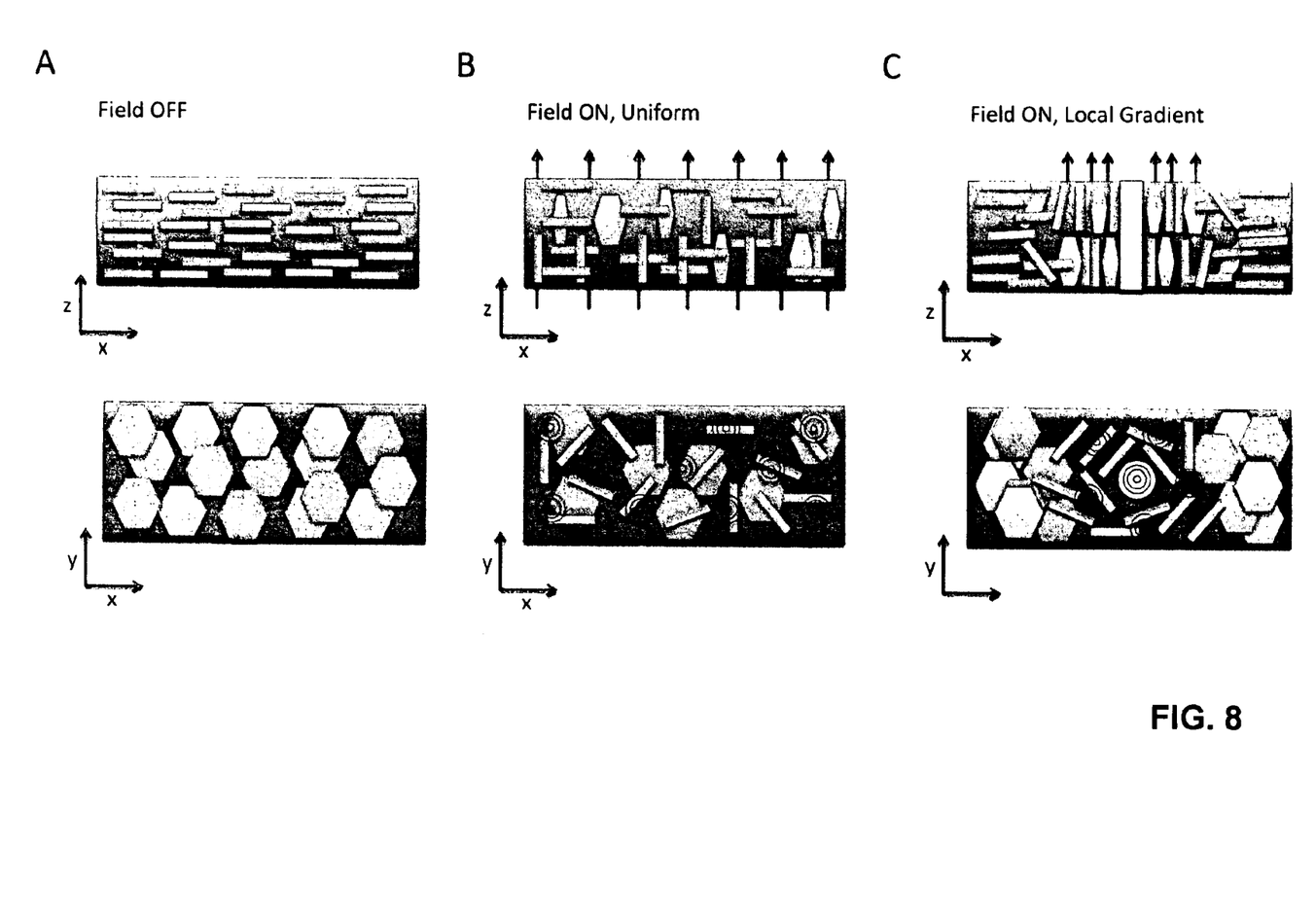
FIG. 8 A selection of possible orientational and spatial configurations of platelet reinforced matrices by combining both platelets with adsorbed magnetic nanoparticles and those without. In (a), no applied field allows the platelets to orient in a standard gravity-driven configuration, parallel to the film. In (b), a uniform vertical field is applied which orients the magnetized platelets perpendicular to the film while not affecting the non-magnetized platelets. In (c), a magnetic field is applied locally around a hole in the matrix. The field orients locally the magnetized platelets. In addition, the local field applies a gradient that spatially clusters the magnetized platelets locally around the affected area while leaving the non-magnetic platelets essentially unaffected.

By including both reinforcing particles that have magnetic and/or superparamagnetic nanoparticles adsorbed to them along with reinforcing particles without magnetic and/or superparamagnetic nanoparticles, a family of unique orientational and spatial configurations is possible. A selection of these possibilities is illustrated in FIG. 8.

4. Setting the Matrix

Setting of the matrix can occur through (1) simple evaporation of the solvent from a polymer solution at high temperatures and/or low pressures, (2) crosslinking and/or polymerization reactions within the polymer matrix triggered by temperature or light, (3) solidification of a polymer melt upon cooling.

5. Conditioning/Heat Treatment of the Composite (Annealing)

To ensure a good adhesion between reinforcing particles and the polymer matrix an additional conditioning step is sometimes advantageous. For example, a strong adhesion between reinforcing alumina platelets and a thermoplastic polyurethane matrix is achieved by heat-treating the final composite at 120-130° C. for 3 hours. The formation of strong interfaces in polyurethane films containing about 20% vol of vertically aligned alumina platelets is clearly indicated by a 3-fold and 9-fold increase of the out-of-plane stiffness of the film, as compared to the out-of-plane stiffness of films reinforced with horizontal platelets and films without platelets, respectively. In other systems, such as those containing photoactive molecules to couple the reinforcing particles to the polymer matrix, light and/or heat can also be used to promote strong interfacial adhesion.

6. Dissolution of Magnetic and/or Superparamagnetic Nanoparticles from Matrix Common chemicals are known to dissolve magnetic and/or superparamagnetic nanoparticles into solution. These chemicals can be used as a post treatment on the composite matrix to remove the magnetic and/or superparamagnetic particles after the matrix is set. It is required that the chemical dissolves the magnetic and/or superparamagnetic nanoparticles at an increased rate as compared with degrading the matrix or reinforcing particles.

Figure 9:
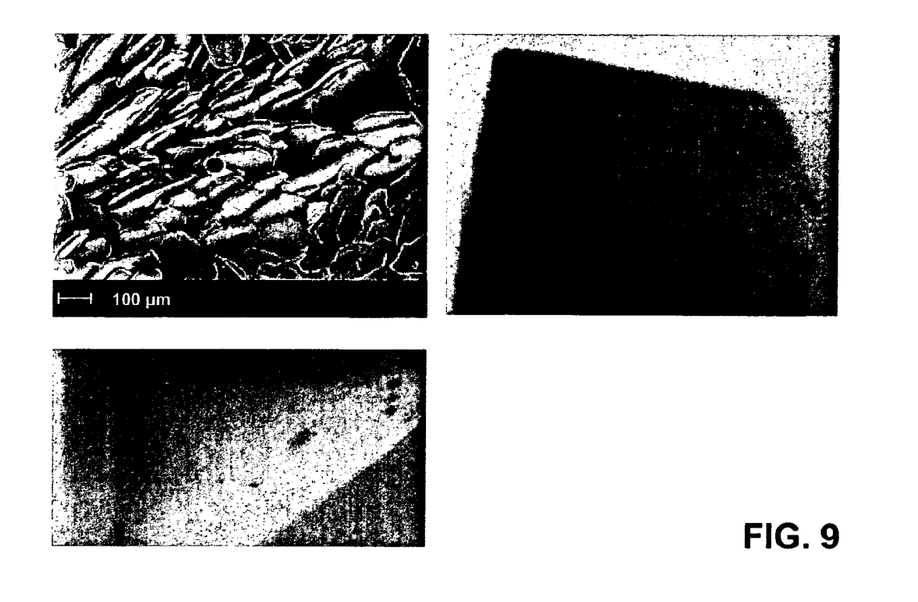
FIG. 9 Reinforcing particles with adsorbed magnetic nanoparticles in a polymer matrix, subjected to a solvent that dissolves the magnetic nanoparticles. Here we show aluminum oxide platelets that had iron oxide adsorbed on their surfaces to allow for perpendicular orientation in a magnetic field. The film was submerged in the phosphoric acid solution to dissolve the iron oxide and left the platelets in their original state as seen in the SEM (top left) and in the photographs before (top right) and after treatment (bottom).

For example, 15 M phosphoric acid can be used to dissolve iron oxide from polyurethane films reinforced with alumina platelets as shown in FIG. 9. Treatment in phosphoric acid for 1 hour dissolves all magnetic and/or superparamagnetic particles without degrading the material or compromising the alignment of the platelets.

BRIEF DESCRIPTION OF THE DRAWINGS

Preferred embodiments of the invention are described with reference to the drawings, which are for the purpose of illustrating the present preferred embodiments of the invention and not for the purpose of limiting the same. In the drawings.

DESCRIPTION OF PREFERRED EMBODIMENTS

Example 1

Out-of-plane reinforced thermoplastic polymer films produced with alumina platelets, iron oxide nanoparticles and polyurethane as reinforcing particles, magnetic particles and thermoplastic matrix polymer, respectively.
1. 50 mL of 10%wt thermoplastic polyurethane (PU, Estallon C64) in dimethylformamide (DMF) solution is made and stirred for 30 hours at 60 C.
2. Meanwhile 200 μL of the 12 nm anionic EMG 705 iron oxide nanoparticle solution from Ferrotec is diluted in 20 mL of pH 7 deionized water. 5 g of commercial 7.5 μm aluminum oxide platelets (Al Pearl, Antaria) are added to the solution and allowed to electrostatically adsorb the magnetic nanoparticles for 24 hours. Then, the platelets are allowed to sediment in the solution and the supernatant is removed and rinsed several times to remove free-floating magnetic nanoparticles.
3. The magnetized platelets are then added at a concentration of 2% Vol to the PU. The solution is thoroughly stirred for 2 hours and sonicated for 5 minutes to ensure homogeneity. To remove air bubbles, the solution is then air-degassed in a desiccator for 1 hour. The solution is then film casted onto a glass substrate.
4. A 400 Gauss magnetic field is applied perpendicular to the film and the glass is kept at 60° C. on a hotplate. The magnetic field will orient the magnetized aluminum oxide platelets perpendicular to the film as the DMF evaporates. Evaporation of DMF leads to an elastic polyurethane film that fixes the oriented structure.
5. Upon complete solvent evaporation, the polyurethane film will contain 20% Vol of perpendicularly oriented platelets such as is shown in FIG. 7.
6. The reinforced polyurethane film is then submersed in a solution of 15M phosphoric acid for 1 hour to dissolve the iron oxide from the platelets.

Example 2

Out-of-plane reinforced thermoset polymer film produced with alumina platelets, iron oxide nanoparticles and epoxy resin as reinforcing particles, magnetic particles and thermoset matrix polymer, respectively.
1. 200 μL of the 12 nm cationic EMG 605 iron oxide nanoparticle solution from Ferrotec is diluted in 20 mL of deionized water at pH 7 to form an aqueous suspension. 5 g of commercial 7.5 μm aluminum oxide platelets (Al Pearl, Antaria) are surface modified with 3-aminopropyltriethoxysilane and/or epoxy-functional silane (gamma-Glycidoxypropyltrimethoxysilane) to enable strong adhesion to the epoxy matrix. The resulting modified alumina platelets are afterwards added to the aqueous suspension and allowed to electrostatically adsorb the magnetic nanoparticles for 24 hours. Then, the platelets are allowed to sediment in the solution and the supernatant is removed and rinsed several times to remove free-floating magnetic nanoparticles.
2. 10 g of epoxy resin (Araldite GY 250, Huntsman) is mixed with 9 g of an anhydride-based crosslinker (Araldur 917, Huntsman) and 0.2 g of the catalyst (Accelerator DY 070, Huntsman) to obtain a resin system displaying setting time longer than 20 minutes at 80° C.
3. The magnetized platelets are then added to the resin system at a concentration of 10% Vol. The mixture is thoroughly stirred for 120 minutes and sonicated for 5 minutes to ensure homogeneity. To remove air bubbles, the solution is then air-degassed in a desiccator for 60 minutes. The solution is then film casted onto a Teflon mold.
4. A 400 Gauss magnetic field is applied perpendicular to the film and the glass is kept at 60° C. on a hotplate. The magnetic field will orient the magnetized alumina platelets perpendicular to the film. Such aligned structure is finally set through cross-linking reactions in the resin system, which are accelerated at the hotplate temperature of 80° C. Crosslinking occurs between molecules in the bulk matrix as well as between matrix molecules and the functional groups present in the alumina platelets (e.g. amine and/or epoxy groups).

Example 3

Out-of-plane reinforced thermoset polymer film produced with glass fibers, iron oxide nanoparticles and epoxy resin as reinforcing particles, magnetic particles and thermoset matrix polymer, respectively.
1. 200 μL, of the 12 nm cationic EMG-605 iron oxide nanoparticle solution from Ferrotec is diluted in 20 mL of deionized water at pH 7. 5g of commercial short glass fibers (FibreGlast Corp. 1/32" milled fibers, 10 μm in diameter and 0.1-10 mm in length) surface modified to obtain strong adhesion with epoxy resins are added to the aqueous suspension and allowed to electrostatically adsorb the magnetic nanoparticles for 24 hours. Then, the fibers are allowed to sediment in the solution and the supernatant is removed and rinsed several times to remove free-floating magnetic nanoparticles.
2. 10 g of epoxy resin (Araldite GY 250, Huntsman) is mixed with 9 g of an anhydride-based crosslinker (Araldur 917, Huntsman) and 0.2 g of the catalyst (Accelerator DY 070, Huntsman) to obtain a resin system displaying setting time longer than 20 minutes at 80° C.
3. The magnetized fibers are then added to the resin system at a concentration of 10% Vol. The mixture is thoroughly stirred for 120 minutes and sonicated for 5 minutes to ensure homogeneity. To remove air bubbles, the solution is then dessicated for 60 minutes. The solution is then film casted onto a Teflon mold.
4. A 400 Gauss magnetic field is applied perpendicular to the film and the glass is kept at 60° C. on a hotplate. The magnetic field will orient the magnetized glass fibers perpendicular to the film. Such aligned structure is finally set through cross-linking reactions in the resin system, which are accelerated at the hotplate temperature of 80° C. Crosslinking occurs between molecules in the bulk matrix as well as between matrix molecules and the functional groups present in the glass fibers (e.g. amine and/or epoxy groups).
5. If desired, the crosslinked film can then be submersed in a solution of 15M phosphoric acid for 1 hour to dissolve the iron oxide from the glass fibers.

| LIST OF REFERENCE SIGNS | | | |
|---|---|---|---|
| l | length of reinforcing particle | | platelet/ribbon |
| t | thickness of reinforcing platelet/ribbon | d | diameter of reinforcing fibres/rod/tube/whisker |
| w | width of reinforcing | | |

The invention claimed is:

1. A method for making a composite material with non-spherical reinforcing particles embedded in a non-conducting matrix, wherein
in a first step magnetic and/or superparamagnetic nano-particles are attached to the non-spherical reinforcing particles,
in a second step the resulting reinforcing particles are introduced into a liquid matrix material and/or a liquid matrix-precursor material, and
in a third step the material of the matrix is solidified and/or polymerized and/or cross-linked
wherein prior to and/or during solidification and/or polymerization and/or cross-linking of the matrix material or the matrix precursor material, respectively, a magnetic field is applied so as to align the reinforcing particles in the matrix and this alignment is fixed in the matrix after the third step,
wherein the weight ratio of the nano-particles to the non-spherical reinforcing particles is 0.0001-0.05, and
wherein the non-spherical reinforcing particles are selected from alumina platelets, gibbsite platelets, clay platelets, talc platelets, mica platelets, glass platelets, silicon carbide platelets, aluminum boride platelets, graphite platelets, aluminum platelets, copper platelets, glass fibres, polymer fibres, carbon fibers, silicon carbide whiskers and silicon nitride whiskers, with the proviso that in case of fibres or whiskers the average diameter (d) is in the range of 1 µm-100 µm.

2. The method according to claim 1, wherein the non-spherical reinforcing particles are selected from the group of fibres, rods, tubes or whiskers or combinations thereof with length (l) in one dimension of at least 0.5 µm.

3. The method according to claim 1, wherein the non-spherical reinforcing particles are selected from the group of platelets, ribbons or combinations thereof with a thickness (t) in the range of 1 nm-10 µm.

4. The method according to claim 1, wherein the nano-particles are attached to the non-spherical reinforcing particles by electrostatic attachment by immersing the nano-particles and the non-spherical reinforcing particles in a fluid, under conditions such that the non-spherical reinforcing particles and the nano-particles have opposite charge.

5. A method for making a composite material with non-spherical reinforcing particles embedded in a matrix, wherein
in a first step magnetic and/or superparamagnetic nano-particles are attached to the non-spherical reinforcing particles,
in a second step the resulting reinforcing particles are introduced into a liquid matrix material and/or a liquid matrix-precursor material, and
in a third step the material of the matrix is solidified and/or polymerized and/or cross-linked
wherein prior to and/or during solidification and/or polymerization and/or cross-linking of the matrix material or the matrix precursor material, respectively, a magnetic field is applied so as to align the reinforcing particles in the matrix and this alignment is fixed in the matrix after the third step,
wherein the weight ratio of the nano-particles to the non-spherical reinforcing particles is below 0.25, and
wherein the nano-particles are attached to the non-spherical reinforcing particles by electrostatic attachment by immersing the nano-particles and the non-spherical reinforcing particles in a fluid, under conditions such that the non-spherical reinforcing particles and the nano-particles have opposite charge, and
wherein the fluid is water and wherein the opposite charge is generated by adapting the pH of the solution to a value above the isoelectric point of one element and below the isoelectric point of the other element.

6. The method according to claim 1, wherein the non-spherical reinforcing particles are selected from the group of fibres, rods, tubes or whiskers or combinations thereof with length (l) in one dimension of at least 0.5 µm and with an average diameter (d) in the range of 1 nm-1 mm.

7. A method for making a composite material with non-spherical reinforcing particles embedded in a matrix, wherein
in a first step magnetic and/or superparamagnetic nano-particles are attached to the non-spherical reinforcing particles,
in a second step the resulting reinforcing particles are introduced into a liquid matrix material and/or a liquid matrix-precursor material, and
in a third step the material of the matrix is solidified and/or polymerized and/or cross-linked
wherein prior to and/or during solidification and/or polymerization and/or cross-linking of the matrix material or the matrix precursor material, respectively, a magnetic field is applied so as to align the reinforcing particles in the matrix and this alignment is fixed in the matrix after the third step,
wherein the weight ratio of the nano-particles to the non-spherical reinforcing particles is below 0.25,
wherein the non-spherical reinforcing particles are selected from the group of fibres, rods, tubes or whiskers or combinations thereof with length (l) in one dimension of at least 0.5 µm, and
wherein the average diameter (d) is in the range of 1 µm-100 µm, with the proviso that the length (l) is at least twice, or at least five times as large as the diameter (d).

8. A method for making a composite material with non-spherical reinforcing particles embedded in a matrix, wherein
in a first step magnetic and/or superparamagnetic nano-particles are attached to the non-spherical reinforcing particles,
in a second step the resulting reinforcing particles are introduced into a liquid matrix material and/or a liquid matrix-precursor material, and
in a third step the material of the matrix is solidified and/or polymerized and/or cross-linked
wherein prior to and/or during solidification and/or polymerization and/or cross-linking of the matrix material or the matrix precursor material, respectively, a magnetic field is applied so as to align the reinforcing particles in the matrix and this alignment is fixed in the matrix after the third step,
wherein the weight ratio of the nano-particles to the non-spherical reinforcing particles is below 0.25, and
wherein the non-spherical reinforcing particles are selected from the group of platelets, ribbons or combinations thereof with a thickness (t) in the range of 50 nm-1000 nm and a width (w) in the range of 10 nm-100 µm, and/or with a length (l) in one dimension of at least 0.5 µm, with the proviso that the length (l) is at least five times as large as the thickness (t), and with the proviso that the width (w) is at least five times as large as the thickness (t).

9. The method according to claim 7 or 8, wherein the weight ratio of the nano-particles to the non-spherical reinforcing particles is in the range of 0.0001-0.05.

10. The method according to claim 7 or 8, wherein the nano-particles are attached to the non-spherical reinforcing particles by electrostatic and/or covalent attachment.

11. The method according to claim 7 or 8, wherein subsequent to the third step or within the third step the non-spherical reinforcing particles the non-spherical reinforcing particles are bonded and/or attached to the surrounding matrix material, by a subsequent fourth annealing step with heat treatment and/or irradiation treatment and/or pressure treatment.

12. The method according to claim 7 or 8, wherein the nano-particles are attached to the non-spherical reinforcing particles by electrostatic attachment by immersing the nano-particles and the non-spherical reinforcing particles in water, under conditions such that the non-spherical reinforcing particles and the nano-particles have opposite charge.

13. The method according to claim 7 or 8, wherein the liquid matrix material and/or the liquid matrix-precursor material is a cross-linkable and/or non-cross-linkable polymeric material, a polymer precursor material or a ceramic (precursor) material, wherein it is selected from the group of polyurethanes, polyethylenes, polypropylenes, polyamides, polyesters, epoxies, polyimides, poly(ether ether ketone), poly(tetra fluorethylene), poly(ethylene terephthalate), poly(vinyl alcohol), as well as natural compounds such us chitosan, agarose, gellan gum, gelatine, collagen, natural rubber, starch and alginate or metals and/or ceramics.

14. The method according to claim 7 or 8, wherein subsequent to the third step and/or a subsequent to a fourth annealing step the nanoparticles are selectively removed from the matrix, wherein removal of the nanoparticles is effected by treating the composite material with an acidic fluid and wherein the treatment takes place at a temperature 10-30° C. below the melting point of the matrix, and wherein the treatment takes place for a timespan of less than 48 hours.

15. The method according to claim 7 or 8, wherein subsequent to the third step and/or a subsequent to a fourth annealing step the nanoparticles are selectively removed from the matrix, wherein removal of the nanoparticles is effected by treating the composite material with a phosphoric acid solution, wherein the acidic solution has a pH-value below 1, and wherein the treatment takes place at a temperature 10-30 [deg.] C. below the melting point of the matrix, and below 30° C., and wherein the treatment takes place for a timespan of less than 10 minutes.

16. The composite material with non-spherical reinforcing particles embedded in a matrix, obtained using a method according to claim 7 or 8, wherein the non-spherical reinforcing particles are magnetically aligned in the matrix material of the composite material, wherein there is an inhomogeneous distribution of the non-spherical reinforcing materials in the matrix.

17. A composite material with non-spherical reinforcing particles embedded in a matrix, made by the method of claim 1, wherein the non-spherical reinforcing particles are magnetically aligned in the matrix material of the composite material,
wherein the composite material takes the shape of a coating or a film, and wherein the non-spherical reinforcing particles are on average arranged in the matrix with the long axis essentially perpendicular to the plane of the coating and/or film, and
wherein the non-spherical reinforcing particles are on average arranged in the matrix with the long axis essentially perpendicular to the plane of the coating and/or film, and wherein the material is essentially free from nano-particles.

18. The method according to claim 7 or 8, wherein prior to and/or during the third step a magnetic field of at most 4000 Gauss is applied.

19. The method according to claim 7 or 8, wherein the weight ratio of the nano-particles to the non-spherical reinforcing particles is in the range of 0.00001-0.10.

20. The method according to claim 7 or 8, wherein the nano-particles are attached to the non-spherical reinforcing particles by van der Waals, electrostatic and/or covalent attachment.

21. The method according to claim 7 or 8, wherein subsequent to the third step or within the third step the non-spherical reinforcing particles the non-spherical reinforcing particles are bonded and/or attached to the surrounding matrix material, by a subsequent fourth annealing step with heat treatment and/or irradiation treatment and/or pressure treatment.

22. The method according to claim 7 or 8, wherein the non-spherical reinforcing particles are coated with a material allowing for the generation of charged non-spherical reinforcing particles if immersed in water,
and/or wherein the nano-particles are coated with a material allowing for the generation of charged nano-particles if immersed in water,
and/or wherein the non-spherical reinforcing particles are coated with a material allowing for bonding and/or attachment of the non-spherical reinforcing particles to the matrix material prior or during the third step and/or during a subsequent an annealing step.

23. The method according to claim 7 or 8, wherein the liquid matrix material and/or the liquid matrix-precursor material is a cross-linkable and/or non-cross-linkable polymeric material, a polymer precursor material or a ceramic (precursor) material.

24. The method according to claim 7 or 8, wherein subsequent to the third step and/or a subsequent to a fourth annealing step the nanoparticles are selectively removed from the matrix.

25. The method according to claim 7 or 8, wherein prior to and/or during the third step a magnetic field of 500 Gauss is applied, so as to lead to an inhomogeneous distribution of the reinforcing particles, wherein this inhomogeneous distribution is a variable concentration of the reinforcing particles as a function of the location in the matrix and/or a variable orientational distribution of the reinforcing particles as a function of the location in the matrix.

26. The composite material with non-spherical reinforcing particles embedded in a matrix, obtained using a method according to claim 1, 7 or 8, wherein the non-spherical reinforcing particles are magnetically aligned in the matrix material of the composite material.

27. The composite material according to claim 26, wherein the composite material takes the shape of a coating or a film, and wherein the non-spherical reinforcing particles are on average arranged in the matrix with the long axis essentially perpendicular to the plane of the coating and/or film.

28. The composite material according to claim 26, wherein the material is one or more of a construction material and/or an adhesive layer and/or a surface coating or surface film and/or as an intermediate layer in a laminate and/or a scratch-resistant lamina and/or a dental restoration and/or an artificial scaffold for tissue regeneration.

29. The composite material according claim 28, having an orientational distribution of the non-spherical reinforcing particles in a plane perpendicular to the plane of the layer, said composite material being applied to at least one of automobile construction, construction of energy-related structures like windmills, aerospatial construction, biomedical implants, dental restorations, strengthened glues and adhesives, cutting tools.

30. The composite material according claim 27, wherein the material is one or more of a construction material and/or an adhesive layer and/or a surface coating or surface film and/or as an intermediate layer in a laminate and/or a scratch-resistant lamina and/or a dental restoration and/or an artificial scaffold for tissue regeneration, having an orientational distribution of the non-spherical reinforcing particles in a plane perpendicular to the plane of the layer, said composite material being applied to at least one of automobile construction, construction of energy-related structures like windmills, aerospatial construction, biomedical implants, dental restorations, strengthened glues and adhesives, cutting tools.

31. The composite material according to claim 27, wherein the material is one or more of a construction material and/or an adhesive layer and/or a surface coating or surface film and/or as an intermediate layer in a laminate and/or a scratch-resistant lamina and/or a dental restoration and/or an artificial scaffold for tissue regeneration.

* * * * *